United States Patent
Hubball et al.

(10) Patent No.: US 8,989,173 B2
(45) Date of Patent: Mar. 24, 2015

(54) INCREASED BLUETOOTH CLOCK ACCURACY

(75) Inventors: Christopher Peter Hubball, Cambridge (GB); Peter Hubball, legal representative, Herts (GB); David Richard Hargreaves, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 777 days.

(21) Appl. No.: 12/741,951

(22) PCT Filed: Oct. 22, 2008
(Under 37 CFR 1.47)

(86) PCT No.: PCT/EP2008/064328
§ 371 (c)(1),
(2), (4) Date: Sep. 20, 2011

(87) PCT Pub. No.: WO2009/059899
PCT Pub. Date: May 14, 2009

(65) Prior Publication Data
US 2012/0250674 A1    Oct. 4, 2012

(30) Foreign Application Priority Data
Nov. 8, 2007 (GB) .................. 0721926.4

(51) Int. Cl.
*H04W 56/00* (2009.01)
*H04J 3/06* (2006.01)

(52) U.S. Cl.
CPC .......... *H04J 3/0697* (2013.01); *H04J 3/0664* (2013.01)
USPC .......................................... 370/350; 370/503

(58) Field of Classification Search
USPC .................................. 370/350, 503
See application file for complete search history.

(56) References Cited

U.S. PATENT DOCUMENTS

| 5,428,645 | A | 6/1995 | Dolev et al. |
| 2002/0031196 | A1 | 3/2002 | Muller et al. |
| 2004/0190378 | A1* | 9/2004 | Farmer ............................ 368/47 |
| 2004/0228367 | A1* | 11/2004 | Mosig ............................ 370/503 |
| 2006/0205449 | A1 | 9/2006 | Hillyard |
| 2008/0031283 | A1 | 2/2008 | Curran-Gray et al. |
| 2008/0175275 | A1 | 7/2008 | Garner et al. |
| 2008/0207126 | A1* | 8/2008 | Grushkevich et al. ....... 455/41.2 |
| 2010/0103955 | A1* | 4/2010 | Biederman et al. ........... 370/503 |

OTHER PUBLICATIONS

International Preliminary Report on Patentability, PCT/EP08/64328, May 11, 2010.

* cited by examiner

*Primary Examiner* — Donald Mills
*Assistant Examiner* — Henry Baron
(74) *Attorney, Agent, or Firm* — Vorys, Sater, Seymour and Pease LLP; Vincent M DeLuca

(57) ABSTRACT

The present invention provides a communications unit for operation in a communication system in accordance with a protocol that operates to a first clock resolution, the communications unit comprising a first clock, operating to the first resolution, a second clock operating to a second resolution higher than the first resolution, means configured to respond to a request to report a clock value by reporting: (a) the current value of the first clock and (b) information indicating the time on the second clock at which the first clock ticked to its current value.

28 Claims, 2 Drawing Sheets

INCREASED BLUETOOTH CLOCK ACCURACY

BACKGROUND OF THE INVENTION

This invention relates to accurately obtaining the Bluetooth Master clock.

A Bluetooth piconet is an ad-hoc Bluetooth network featuring a master node and one or more slave nodes. There can be up to seven active slave nodes in a piconet although additional nodes (up to 255) may remain synchronized to the master but 'parked' and not active in the piconet.

Each Bluetooth device features a clock, that has a tick period of 312.5 µs (this equates to half a Bluetooth slot period). The clock of the master device is used as a 'Master Clock' within the piconet and is transmitted to the slave devices. Each slave device maintains a clock offset value which is the offset between the master clock and its own clock. This offset value is updated every time a packet is received from the master clock.

For an application running on a slave device, the most accurate available network synchronised clock is the Master Clock. However, the resolution of the Master Clock available to the application is limited by the Host Controller Interface. This limitation, defined by the Bluetooth specification, allows only the most recent clock tick to be visible to the application. Furthermore, the command time, defined as the period of time between when the application requests the Master Clock through the Host Controller interface and when it receives the Master Clock data, is significant, and can add to the inaccuracy of the low resolution representation of the Master Clock time.

Therefore, when the application running on a slave device attempts to estimate the Master Clock time, the estimate is approximated by the equation:

Master Clock Estimate=Master Clock+Clock Rounding Error+Clock Drift+Command Time Given the resolution of the Bluetooth clock, the clock rounding error is 0-312.5 µs. The clock drift of the Master device internal clock is approximately 20 ppm (parts per million) and so assuming that the Master Clock is transmitted to each slave device at least every 25 ms, this will be +/−1 µs. The command time varies with implementation but is typically in the order of several milliseconds.

Therefore, the worst case error is given by:

Worst Case Error=312.5 µs+1 µs+2000 µs=2313.5 µs

Given the speed of sound, a sound wave will travel approximately 78 cm in 2313.5 µs. In a stereo environment in which the left and right audio channels are controlled by separate Bluetooth devices, this could result in one channel having a delay of 2313.5 µs relative to the other channel. Given the sophisticated auditory and spatial calculations performed by the brain, this would present to the listener the illusion of a speaker 78 cm away from the expected position. Particularly when used in the present context of a pair of headphones, such spatial variation would be disorientating to the listener.

SUMMARY OF THE INVENTION

In the above example, the estimation error is dominated by the Command Time and the Clock Rounding. If these could then be removed and an adjustment made for the Clock Drift, the only difference between the Master Clock estimate and the actual Master Clock would be a small amount of clock drift.

According to one aspect of the present invention, the problem of inaccuracies introduced as a result of the Command Time and the Clock Rounding is addressed.

BRIEF DESCRIPTION OF THE DRAWINGS

An embodiment of the present invention will now be described by way of example with reference to the accompanying drawings. In the drawings.

DETAILED DESCRIPTION OF THE INVENTION

Figure 1:
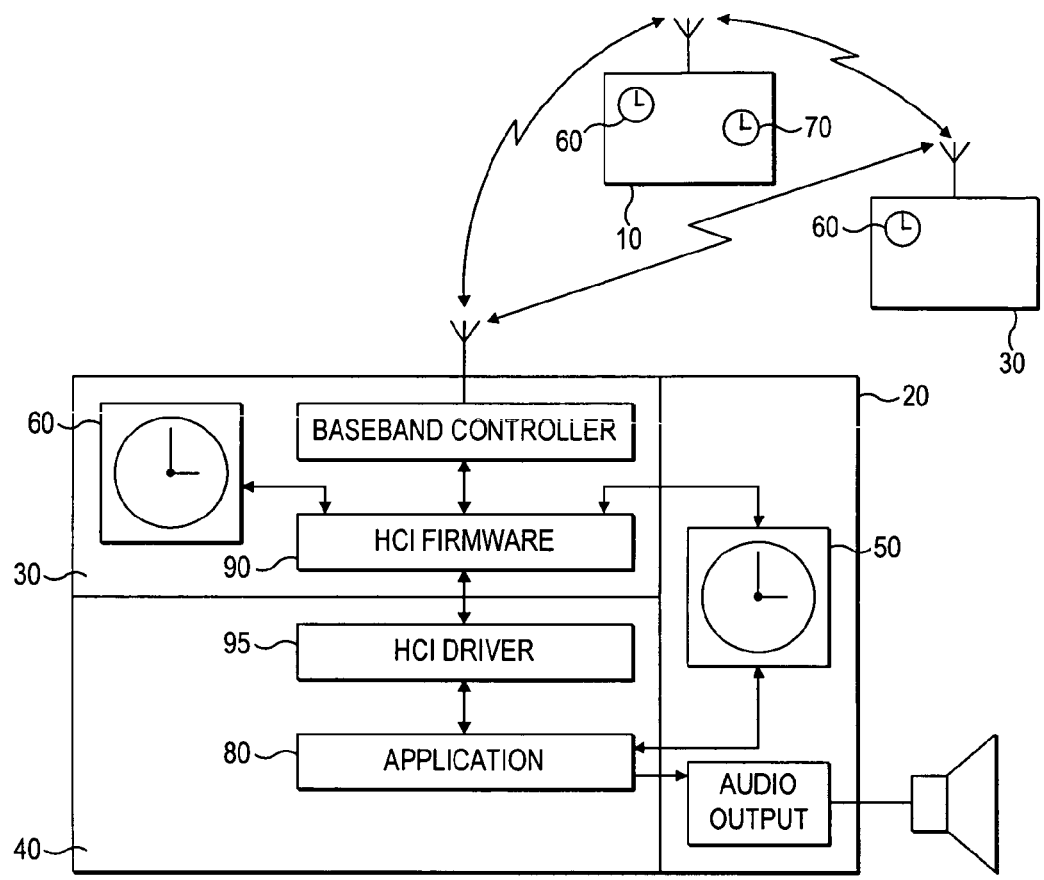
FIG. 1 shows a Bluetooth device featuring an embodiment of the invention.

FIG. 1 shows an embodiment of the invention in which a Bluetooth device 20 has joined a piconet as an active node, along with nodes 30 and 10. A decision is made between the nodes as to which device will, at least temporarily, act as the Master device (in this case node 10), and the internal clock 70 of said Master device 10 is then used to directly generate the Master Clock 60 for the Bluetooth network.

On Bluetooth device 20, a local representation of the Master Clock 60 is kept and is maintained using the internal clock 50 and a stored offset value between the Master Clock and the internal clock. The offset value is updated every time a packet is received from the Master device.

Internal clock 50 is available to application 80 directly. However, Master clock 60, which is the only network-wide synchronised clock, is only available to application 80 through the Host Controller Interface (HCI), and only at the resolution defined by the Bluetooth specification. This is limited to the Master Clock period, and only the most recent clock tick is available to the application. Furthermore, the command time for retrieving this clock value using the HCI is significantly long, and so the received clock value will be old by the time it is received back by the application.

In order to enhance the clock resolution, an embodiment of the present invention provides a means for obtaining a more accurate representation of the master clock.

In one embodiment of the present invention, the application running on the Bluetooth device may request an 'accurate representation of the Master clock' instead of usual standard Master clock value available through the HCI. This request is then passed to the HCI firmware 90. Instead of using the Bluetooth method defined in the Bluetooth specification, the HCI firmware obtains the most recent Master clock tick value, and a local timestamp value in µs for when the Master clock tick changed. The time stamping is performed by extracting from internal clock 50 (readily accessible to firmware 90) at the time when the Master clock tick changed.

A data package is then formed using the tick value and the time stamp. This data package is then sent back to the application.

The application then compensates for the delay in obtaining the 'accurate representation of the Master clock' value by adjusting the accurate Master clock value by the offset between the timestamp and the present internal clock value.

Using the accurate Master clock value, the application can then accurately schedule playback of audio data. The audio data may be locally generated, or sent to Bluetooth device 20 from another device on the network.

This embodiment of the invention provides the application with a more accurate representation of the Master clock value than previously available. Further more, although it might receive this representation relatively late, it can compensate by adjusting the representation by the offset between the received timestamp and the present internal clock value.

Therefore, the representation of the Master clock has following relationship to the actual Master clock.

$$\text{Representation} = \text{Master Clock} + \text{Clock Rounding Error} +$$
$$\text{Clock Drift} + \text{Command Time}$$
$$= \text{Master Clock} \pm 0\,\mu s \pm 1\,\mu s \pm 0\,\mu s$$
$$= \text{Master Clock} \pm 1\,\mu s$$

The worst case error between the representation and the master clock is 1 μs. Given the speed of sound, 1 μs amounts to less than 1 mm, and would therefore not be perceivable to the user.

Therefore, an advantage of the present invention is to allow synchronised stereo headphones, in which the right and left ears are controlled by separate Bluetooth devices. The present invention allows, by means of the accurate representation of the Master clock, the audio playback in each headphone to be very accurately scheduled to a network wide clock, and so any spatial disorientation by the user can be avoided.

Figure 2:
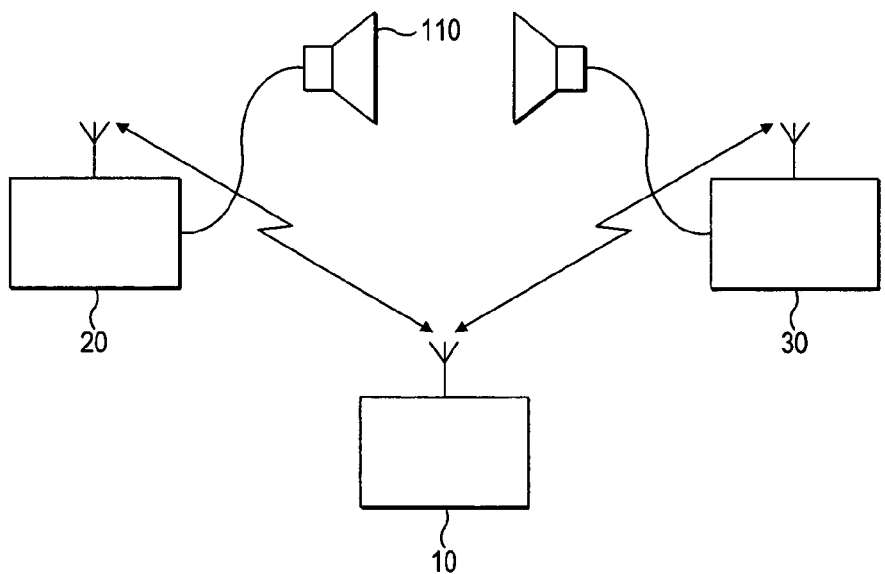
FIG. 2 shows a Bluetooth network featuring wireless Bluetooth headphones.

In the embodiment shown in FIG. 2, Bluetooth audio device 10 is the Bluetooth master device, which provides the Master Clock for the piconet. Bluetooth audio device 10 sends the appropriate audio data to the left and right channel playback Bluetooth devices 20 and 30 and playback at the respective channel is scheduled according to the Master Clock, set by Bluetooth audio device 10.

Figure 3:
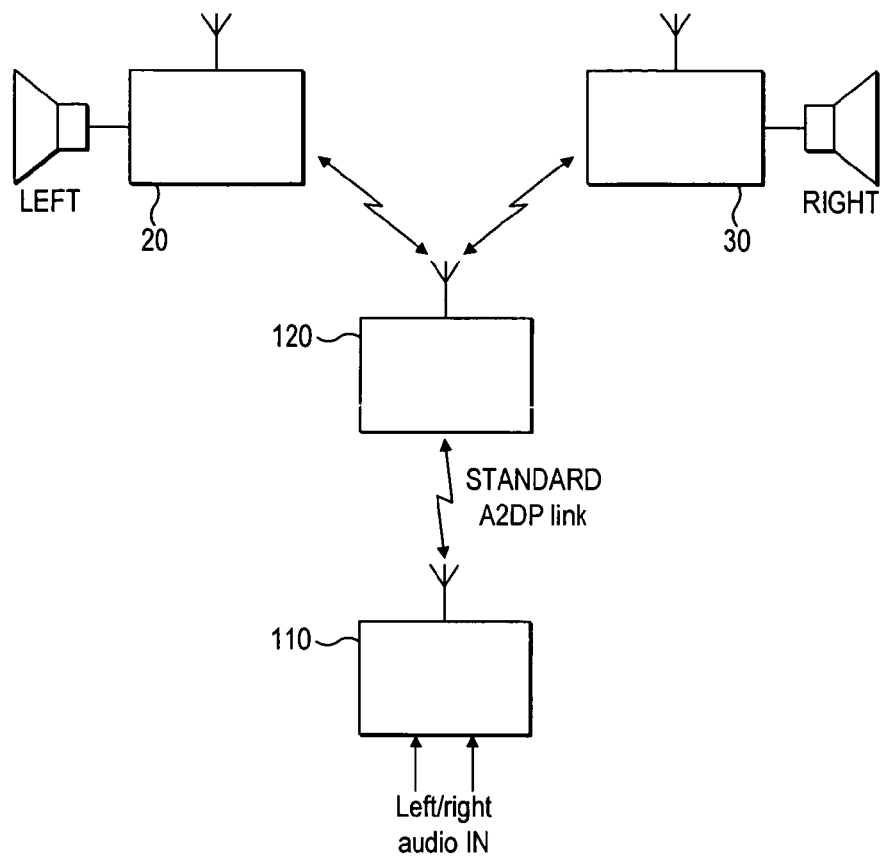
FIG. 3 shows an alternative to FIG. 2, in which a third device provides the master clock.

In the embodiment shown in FIG. 3, Bluetooth audio device 110 sends the audio data to Bluetooth master device 120 using Advanced Audio Distribution Profile (A2DP). Bluetooth master device 120 provides the Master Clock for the piconet. Bluetooth master device 120 sends the appropriate audio data to the left and right channel playback Bluetooth devices 20 and 30 and playback at the respective channel is scheduled according to the Master Clock, set by Bluetooth master device 120.

Figure 4:
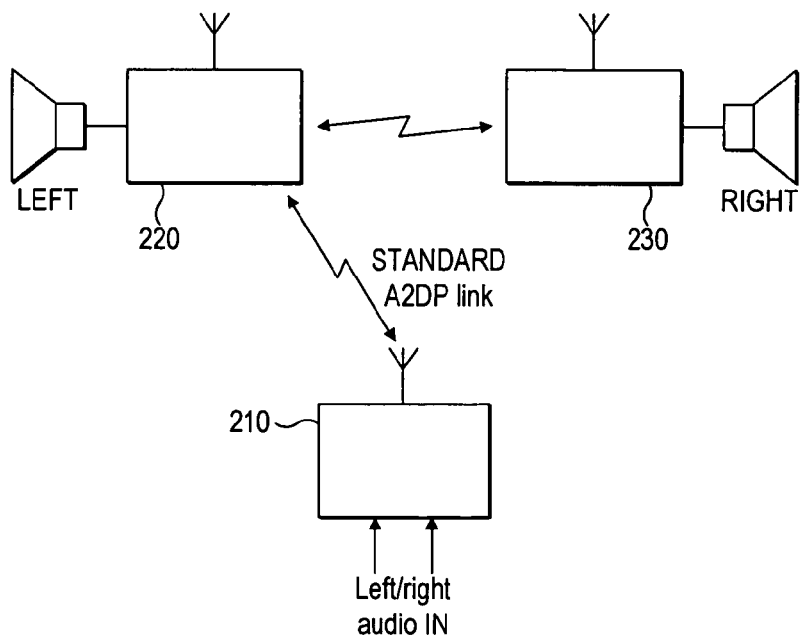
FIG. 4 shows an alternative to FIG. 2, in which the left channel device provides the master clock.

In the embodiment shown in FIG. 4, left channel playback device 220 is the Bluetooth master device, which provides the Master Clock for the piconet. Bluetooth audio device 210 sends the appropriate audio data to the left and right channel playback Bluetooth devices 220 and 230 and playback at the respective channel is scheduled according to the Master Clock, set by left channel playback Bluetooth device 220.

The audio data sent to the left and right channel playback Bluetooth devices preferably comprises 'time to play' information which provides scheduling information for playback of the specific audio samples at specific times relative to the accurate Master Clock. The 'time to play' information allows playback of the audio samples within the audio data to occur at the left and right channels at substantially the same time, allowing close synchronization of the channels.

In an alternative embodiment, the 'time to play' information can be sent to the playback devices separately from the audio data.

By feeding the accurate representation of the Master clock and internal clock pair into a digital signal processor (not shown) that also has access to the internal clock, it is possible for it to make slight speed adjustments to the audio playback rate, to ensure that the audio streams are accurately synchronised. This speed adjustment technique is known as warping.

Audio data sources may include a Bluetooth enabled CD player, MP3 player, mobile phone device, or any other device used for playback of music or sound.

The present invention can also be used for transmitting synchronised video data rather than audio data. For example, any application that requires synchronised video streams between separate Bluetooth devices would find this invention advantageous. This may include monitor banks or 3D glasses.

Further uses of the present invention may relate to non-media applications, in which a high degree of temporal accuracy is required, such as a controlling device for a computer game, or a Bluetooth network based stopwatch system.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A communications unit for operation in a Bluetooth communication system that operates to a first clock resolution, the communications unit comprising:
   a first clock, operating to the first resolution;
   a second clock operating to a second resolution higher than the first resolution; and
   a controller configured to:
      respond to a request from a requester to report a clock value by reporting: (a) the current value of the first clock and (b) first information indicating the time on the second clock at which the first clock ticked to its current value;
      wherein the requester is configured to:
      when said report is received, determine second information indicating time on the second clock; and
      adjust said current value by an offset between the first information and the second information.

2. The communications unit of claim 1, wherein the first clock is the Bluetooth network Master clock.

3. The communications unit of claim 2, wherein the first clock resolution is limited to the clock tick period.

4. The communications unit of claim 3, wherein the clock tick period is 312.5 μs.

5. The communications unit of claim 4, wherein the first clock resolution is limited by the Host Controller Interface of the Bluetooth device.

6. The communications unit of claim 1, wherein the request to report a clock value is made by an application running on the device.

7. The communications unit of claim 6, wherein the application uses the reported data to accurately simulate the first clock.

8. The communications unit of claim 7, wherein the application uses the accurate simulation of the first clock to schedule a time sensitive task.

9. The communications unit of claim 8, wherein the time sensitive task comprises playback of media data.

10. The communications unit of claim 9, wherein the media data is received by device from a media source.

11. The communications unit of claim 9, wherein the media data is audio data.

12. The communications unit of claim 10, wherein the media data is audio data.

13. The communications unit of claim 1, wherein the first clock is a representation of a Bluetooth master clock.

14. The communications unit of claim 6, wherein the application determines said second information.

15. The communications unit of claim 9, wherein the communications unit is configured to adjust the playback of the media data in dependence on said adjusted current value.

16. A communications system, comprising:
a first communications unit comprising a first clock operating to a first resolution and being configured to:
send a first clock signal representing a time on the first clock; and
perform a time sensitive task according to the time on the first clock;
a second communications unit configured to:
receive the first clock signal;
maintain a representation of the first clock in dependence on the received first clock signal; and
perform the time sensitive task according to the maintained representation of the first clock; and
a third communications unit configured to send data for performing the time sensitive task to the first communications unit and to the second communications unit, wherein the data sent to the second communications unit is sent via the first communications unit.

17. The communications system of claim 16, wherein the first communications unit is configured schedule the performance of the time sensitive task in dependence on the first clock.

18. The communication system of claim 16, wherein the second communications unit is configured to perform the time sensitive task in dependence on scheduling data received from the first communications device.

19. The communications system of claim 16, wherein the third communications unit comprises a third clock operating to the first clock resolution and is further configured to send scheduling information for the time sensitive task in dependence on the third clock.

20. The communication system of claim 16, wherein the third communications unit is configured to:
receive the first clock signal;
maintain a representation of the first clock in dependence on the received first clock signal; and
send scheduling information for the time sensitive task in dependence on the representation of the first clock.

21. The communications system of claim 16, wherein the time sensitive task comprises playback of media data.

22. The communication system of claim 16, wherein the third communications unit is a media source.

23. The communications system of claim 16, wherein the first and second communications units each comprise a speaker.

24. The communications systems of claim 16, wherein the second communications unit comprises a second clock operating to a second resolution higher than the first resolution and the second communications unit is configured to adjust a value from the representation of the first clock in dependence on the second clock.

25. The communications systems of claim 16, wherein the first communications unit comprises a second clock operating to a second resolution higher than the first resolution and is configured to adjust a value from the first clock in dependence on the second clock.

26. The communications system of claim 16, wherein the second communications unit is configured to:
respond to a request to report a clock value by reporting: (a) the current value of the representation of the first clock and (b) first information indicating the time on a second clock at which the representation of the first clock ticked to its current value; and
determine second information indicating another time on the second clock; and adjust said current value by an offset between the first information and the second information,
wherein the second clock is configured to operate to a second resolution higher than the first resolution.

27. The communications system of claim 16, wherein the communications system is a Bluetooth communication system.

28. The communications system of claim 27, wherein the first clock is a Bluetooth network Master clock.

* * * * *